(12) United States Patent
Preda et al.

(10) Patent No.: US 9,212,713 B2
(45) Date of Patent: Dec. 15, 2015

(54) CALIPER BODY FOR DISK BRAKE

(71) Applicant: Freni Brembo S.p.A., Curno, Bergamo (IT)

(72) Inventors: Massimo Preda, Curno (IT); Armando Puddu, Curno (IT); Fabio Scotti, Curno (IT); Cristian Crippa, Curno (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 14/379,229

(22) PCT Filed: Feb. 15, 2013

(86) PCT No.: PCT/IB2013/051246
§ 371 (c)(1),
(2) Date: Aug. 15, 2014

(87) PCT Pub. No.: WO2013/121393
PCT Pub. Date: Aug. 22, 2013

(65) Prior Publication Data
US 2015/0021124 A1 Jan. 22, 2015

(30) Foreign Application Priority Data
Feb. 16, 2012 (IT) .............................. TO2012A0140

(51) Int. Cl.
*F16D 65/847* (2006.01)
*F16D 55/228* (2006.01)
*F16D 65/00* (2006.01)

(52) U.S. Cl.
CPC ............ *F16D 65/847* (2013.01); *F16D 55/228* (2013.01); *F16D 65/0075* (2013.01)

(58) Field of Classification Search
None
See application file for complete search history.

(56) References Cited

U.S. PATENT DOCUMENTS

| 2013/0277158 A1* | 10/2013 | Previtali et al. ............ 188/73.47 |
| 2014/0158483 A1* | 6/2014 | Miyahara et al. .......... 188/73.47 |
| 2015/0027822 A1* | 1/2015 | Cerutti et al. .............. 188/73.47 |

FOREIGN PATENT DOCUMENTS

| GB | 2 187 807 A | 9/1987 |
| GB | 2473001 A | 3/2011 |
| WO | WO 2006/035464 A1 | 4/2006 |
| WO | WO 2008/075386 A1 | 6/2008 |

* cited by examiner

*Primary Examiner* — Christopher Schwartz
(74) *Attorney, Agent, or Firm* — Dickstein Shapiro LLP (57) ABSTRACT

A caliper body (1) of a disc brake caliper, said body being adapted to arrange astride of a brake disc, said body (1) comprising a first (5) and a second (11) wheel side elongated portion, the second wheel side portion comprises at least one wheel side opening (21; 22; 45) which places a channel for receiving the disc in communication with the outside of the wheel side caliper body (23), and wherein said at least one opening (21; 22; 45) is an axial central opening (45) which places said channel for receiving the disc in communication with the outside of the wheel side caliper body (23), and wherein said axial central opening (45) has a closed edge which delimits said opening at a face thereof substantially in axial direction, and wherein said at least one axial central opening (45) is arranged at least partially substantially radially overlapping at least one wheel side cylinder (12; 33), wherein said at least one axial central opening (45) is arranged substantially in the center of said second wheel side elongated portion.

11 Claims, 6 Drawing Sheets

CALIPER BODY FOR DISK BRAKE

FIELD OF THE INVENTION

The present invention relates to a caliper body for a disc brake caliper.

In particular, the present invention relates to a body for disc brake caliper of the fixed type, i.e., one that has, when it is mounted on a vehicle suspension, housings for thrust means or pistons arranged on both its side located towards the vehicle, and housings for thrust means or pistons arranged on its opposite side, i.e., facing the vehicle wheel.

As it is known, these fixed caliper bodies are used mainly for high-performance vehicles or vehicles having a considerable mass to be braked. In fact, it is known that these fixed caliper bodies have a considerable strength, capable of withstanding also severe braking actions without showing a flexibility such as to compromise the braking itself and of avoiding to compromise the important braking readiness feel for the vehicle driver.

It is also known that this important characteristic of strength, or mechanical rigidity of the caliper body, is in contrast with the need to have discharging routes for the heat generated by the interaction between the pads, housed in the caliper body, and the braking disc. In fact, the more a robust caliper body is desired, the more the caliper shape implements a closed structure; while, the more the heat coming from the disc (in particular in order to avoid that the brake fluid boils and is therefore compressible, thus degrading the braking action of the vehicle) has to be discharged, the more a caliper body having large openings for the heat outflow and the cooling air inlet is needed.

STATE OF THE PRIOR ART

From the document EP 1 586 787-A1 by Akebono Corporation North America and the document U.S. Pat. No. 6,173,819-B1 by Continental Teves AG & Co., caliper bodies are known, for example, of the floating type, having large undercuts which place the inner portion of the caliper body housing the brake disc directly in communication with the outside.

As stated above, these solutions are completely unsuitable for vehicles requiring high braking performance, since they turn out to be particularly poor in both their ability to apply a braking force to the brake disc, and in their pliant structure. Particularly, these solutions have connection areas between enlarged portions thereof that are suitable to face the brake disc, and bridges arranged astride of the disc, which are interested by openings and are irresolubly structurally weak.

From the document GB2187807 by Teves GmbH, it is known to implement a fixed caliper composed of two parts facing one another to close a disc sector. This known solution has lowerings arranged externally to piston housing cylinders. This solution has an opening centrally to the end bridges at the disc.

This known solution is completely unsuitable to evacuate the heat built up during the braking action at the pads and moreover in the proximity of the pistons housed in the cylinders and projecting in pockets receiving the pads, in which pockets the heat generated during the braking action is built up.

Solution

Therefore, it is the object of the present invention to devise a caliper body for disc brake that has such structural and functional characteristics as to meet the above-mentioned needs, while obviating the drawbacks set forth with reference to the prior art.

Such a problem is solved by a caliper body as defined in the appended claim 1, as well as by a caliper according to the appended claim 11.

In accordance with a general embodiment, a caliper body of a disc brake caliper is adapted to arrange astride of a brake disc. Said brake disc has a first braking surface, or vehicle side braking surface, and a second opposite braking surface, or wheel side braking surface. Said surfaces of said disc are coaxial to an axis of rotation of the disc defining an axial direction, as well as an orthogonal direction radial to the disc and a further circumferential or tangential orthogonal direction.

Said caliper body comprises a first vehicle side elongated portion that is adapted to face said first braking surface of the brake disc. Said elongated portion comprises at least one first vehicle or cylinder side piston seat adapted to seat a first piston which may be biased with a brake fluid exiting from said cylinder for influencing a first pad adapted to be seated within said caliper body and arranged between said first vehicle side elongated portion and said first braking surface so as to abut against said first braking surface and to exert a braking action on the brake disc. Said vehicle side elongated portion has a longitudinal extension in circumferential direction and comprises a first disc input side end and an opposite second disc output side end. Said body further comprises an opposite second wheel side elongated portion adapted to face said opposite second braking surface of the brake disc. Said wheel side elongated portion comprises at least one second wheel side piston seat, or wheel side cylinder, adapted to seat a second piston which may be biased with a brake fluid exiting from said cylinder for influencing a second opposite pad adapted to be seated within said caliper body and arranged between said second wheel side elongated portion and said opposite second braking surface so as to abut against said second braking surface and to exert a braking action on the brake disc.

Advantageously, said wheel side elongated portion has a longitudinal extension in the circumferential direction and comprises a first disc input end and an opposite second disc output end.

Advantageously, said body further comprises a first disc input end bridge adapted to arrange astride of the brake disc and to connect said first vehicle side disc input end of said first vehicle side elongated portion with said first wheel side disc input end of said second wheel side elongated portion. Said body further comprises a second disc output end bridge adapted to arrange astride of the brake disc and to connect said second vehicle side disc output end of said first vehicle side elongated portion with said second wheel side disc output end of said second wheel side elongated portion. Said first and second elongated portions and said first and second end bridges form a yoke or a yoke-shaped closed structure which delimits internally a channel for receiving a portion of the brake disc, which channel is adapted to receive a sector of the brake disc placing the caliper body astride thereof.

In accordance with an advantageous embodiment, said second wheel side elongated portion comprises at least one wheel side opening putting said channel for receiving the disc in communication with the outside of the wheel side caliper body.

In a particularly advantageous manner, said at least one opening has a closed edge which delimits said opening so that it has a face thereof substantially in the axial direction.

Advantageously, said at least one opening is an axial central opening putting said channel for receiving the disc in communication with the outside of the wheel side caliper body, where by central it is meant that it is arranged substantially in the center of said second wheel side elongated portion. With further advantage, said axial central opening has a closed edge which delimits said opening at a face thereof substantially in axial direction. Advantageously, said at least one axial central opening is arranged at least partially substantially radially overlapping at least one wheel side cylinder, in other terms, this opening is arranged at least partially, following the radial direction, above at least one cylinder.

By virtue of the central opening, the heat generated during the braking action is not built up in the pocket of the caliper body housing the pad, but it finds, above the cylinders, this axial central opening from which it can exit, thus avoiding to bring the brake fluid adapted to influence in output the piston to boil.

In accordance with an embodiment, at least one further axial opening is provided, which is arranged outside said at least one cylinder going towards at least one of said end bridges. In accordance with an embodiment, at least one part of this axial opening is arranged underneath at least one of said end bridges, where by the term "underneath" it is meant that the end bridge at least partially overlaps in the radial direction said axial opening from the closed edge.

By virtue of the proposed solution, the caliper body is particularly suitable for applications that generate strong structural stresses, avoiding substantial deformations of the caliper body and also avoiding pliancy feels of the braking system to the vehicle user. At the same time, by virtue of the proposed solution, it is possible to suitably ventilate the portion of the caliper body in the proximity of the cylinders and, in accordance with a further embodiment, also the disc immediately downstream, or upstream, of the brake pads.

At the same time, the proposed solution allows lightening the structure of the caliper body, avoiding anyhow structural weakenings. In particular, by virtue of the proposed solution, it is possible to avoid weakening the connection bridges of the enlarged portions facing the disc braking surfaces, and in particular to avoid weakening the connecting portions of these bridges to the enlarged portions, where, on the contrary, the maximum structural rigidity of the caliper body is maintained.

FIGURES

Further characteristics and advantages of the caliper body for disc brake according to the invention will be clear from the description set forth below of preferred implementation examples thereof, given by way of indicative, non-limiting example, with reference to the appended Figures, in which.

DESCRIPTION OF SOME PREFERRED IMPLEMENTATION EXAMPLES

Figure 10:
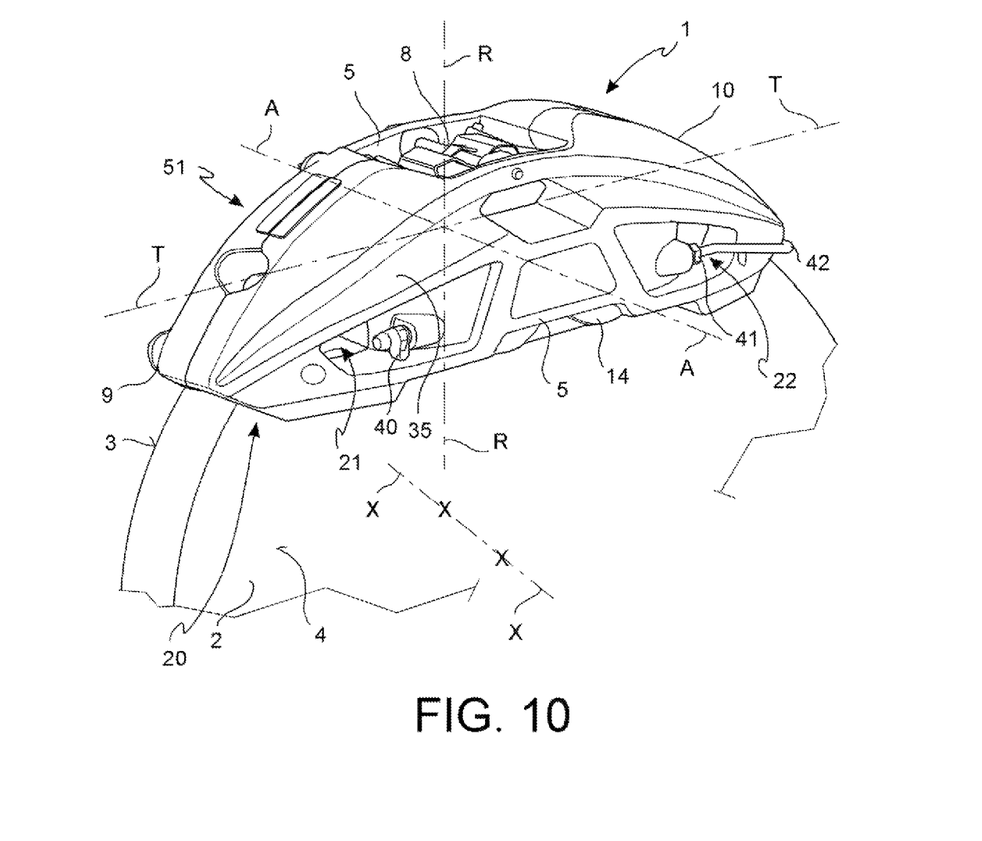
FIG. 10 represents a disc brake caliper associated astride of a brake disc according to a still further embodiment.

With reference to the above-mentioned Figures, a caliper body 1 of a disc brake caliper 51 is suitable to arrange astride of a brake disc 2 [FIG. 10].

Said brake disc 2 has a first braking surface 3, or vehicle side braking surface, and an opposite second braking surface 4, or wheel side braking surface.

Said braking surfaces 3, 4 are coaxial to an axis of rotation X-X of the brake disc 2.

Said axis of rotation X-X defines an axial direction A-A and a direction orthogonal thereto and directed radially to the disc R-R, as well as a further direction orthogonal or circumferential or tangential T-T to said brake disc 2.

Figure 1:
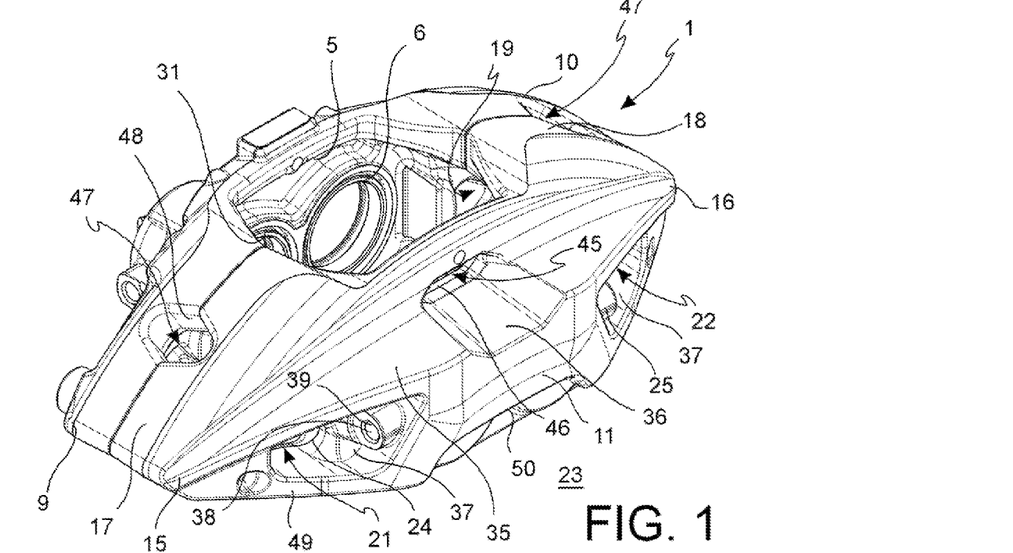
FIG. 1 represents in axonometric view a caliper body as seen from the wheel and disc input side.

Said caliper body 1 comprises a first vehicle side elongated portion 5 that is adapted to face said first braking surface 3 of the brake disc 2 [from FIG. 1].

Said elongated portion 5 comprises at least one first vehicle side piston seat, or vehicle side cylinder, that is adapted to seat a first piston 7. Said piston 7 may be biased with a brake fluid exiting from said cylinder 6 for influencing a first pad 8 adapted to be seated within said caliper body 1 between said first vehicle side elongated portion 5 and said first braking surface 3 of the brake disc 2 so as to abut against said first braking surface and to exert a braking action thereon.

Said vehicle side elongated portion 5 has a longitudinal extension in circumferential direction T-T and comprises a first disc input side end 9 and an opposite second disc output side end 10.

In accordance with the embodiment, said body 1 further comprises an opposite second wheel side elongated portion 11 adapted to face said opposite second braking surface 4 of the brake disc 2.

Said elongated portion 11 comprises at least one second wheel side piston seat, or wheel side cylinder 12, adapted to seat a second piston 13. Said second piston 13 may be biased with a brake fluid exiting from said cylinder 12 so as to influence a second opposite pad 14 adapted to be seated within said caliper body 1 and arranged between said second wheel side elongated portion 11 and said opposite second braking surface 4 so as to abut against said second braking surface for exerting a braking action on the brake disc 2.

Said wheel side elongated portion 11 has a longitudinal extension in circumferential direction T-T and comprises a first disc input end 15, as well as an opposite second disc output end 16.

Said body 1 further comprises a first disc input end bridge 17 adapted to arrange astride of the brake disc 2 and to connect said first vehicle side disc input end 9 of said first vehicle side elongated portion 5 with said first wheel side disc input end 15 of said second wheel side elongated portion 11.

Said body 1 further comprises a second disc output end bridge 18 adapted to arrange astride of the brake disc 2 and to connect said second vehicle side disc output end 10 of said first vehicle side elongated portion 5 with said second wheel side disc output end 16 of said second wheel side elongated portion 11.

Advantageously, said first and second elongated portions 5, 11 and said first and second end bridges 17, 18 form a yoke or a yoke-shaped closed structure which delimits a channel for receiving a portion of the brake disc 19 which is adapted to receive or encompass a sector 20 of the brake disc 2 placing the caliper body 1 astride thereof.

In accordance with an embodiment, said second wheel side elongated portion 11 comprises at least one wheel side opening 21 and/or 22 which places said channel for receiving the disc 19 in communication with the outside of the wheel side caliper body 23.

In a particularly advantageous manner, said at least one opening 21 and/or 22 has a closed edge 24 or which delimits said opening at a face thereof substantially in axial direction A-A.

In accordance with an embodiment, said at least one opening 21 and/or 22 is arranged internally in said second wheel side elongated portion 11 avoiding influencing the edge thereof connecting with an end bridge 17 and/or 18. In accordance with an embodiment, between said at least one opening 21 and/or 22 and said end bridge 17 and/or 18, a caliper body portion is provided, extending longitudinally and which firmly and completely joins the end bridge 17 and/or 18 to said second wheel side elongated portion 11.

In accordance with a particular advantageous embodiment of the present invention, said at least one axial opening 21 and/or 22 is arranged outside said at least one cylinder 12 and extends towards at least one of said end bridges 17 and/or 18.

In accordance with a particular embodiment, at least one part of said at least one axial opening 21 and/or 22 is arranged underneath at least one of said end bridges 17 and/or 18, whereby the term "underneath" it is meant that the end bridge at least partially overlaps in the radial direction said axial opening from the closed edge.

In accordance with an embodiment, said at least one axial opening are two axial openings 21 and 22 which place said channel for receiving the disc 19 in communication with the outside of the wheel side caliper body 23.

In accordance with an embodiment, said two axial openings 21 and 22 are arranged outside said at least one cylinder 12, for example, on opposite sides of said cylinder 12 and directed towards said end bridges 17 and 18. In accordance with an embodiment, said openings 21 and 22 are at least partially placed underneath said end bridges 17 and 18.

Figure 2:
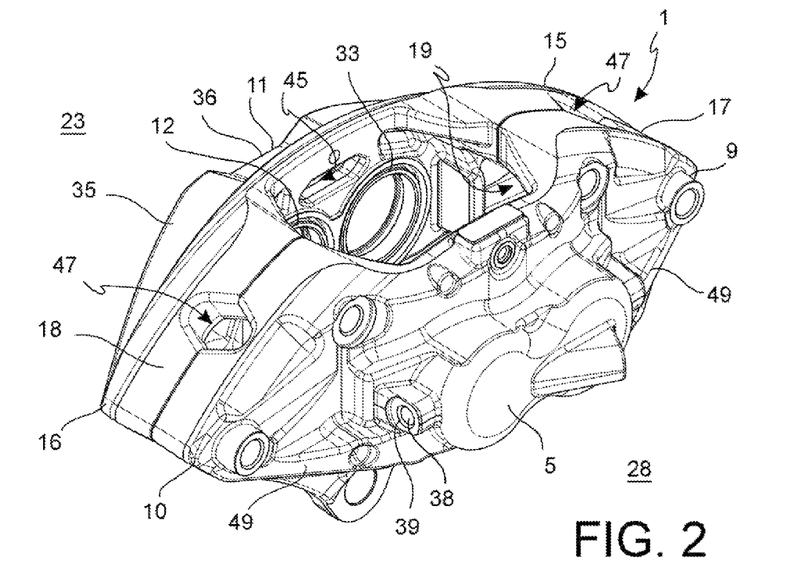
FIG. 2 illustrates in axonometric view the caliper body of FIG. 1 on the vehicle and disc output side.
Figure 3:
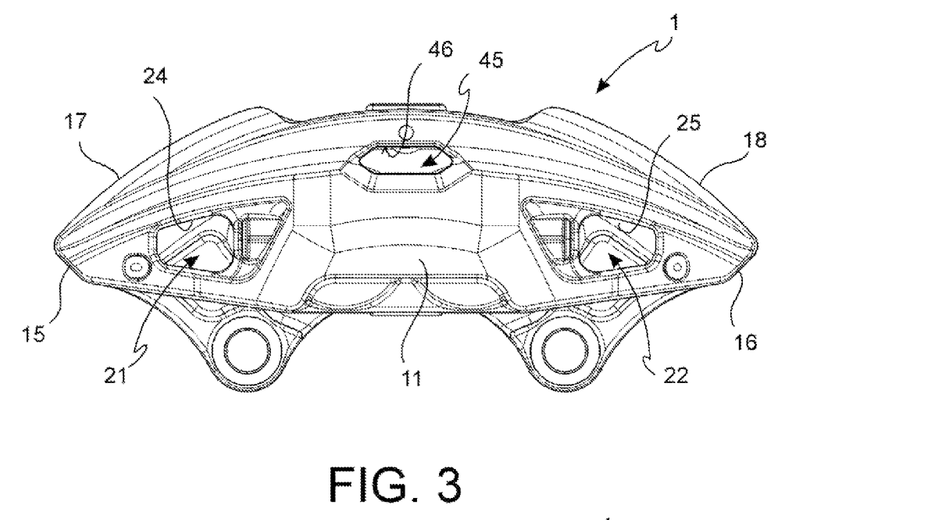
FIG. 3 represents a wheel side front view of the caliper body of FIG. 1.

In accordance with an embodiment, said first vehicle side elongated portion 5 also comprises at least one vehicle side opening 26 and/or 27 placing said channel for receiving the disc 19 in communication with the outside of the vehicle side caliper body 28.

In accordance with an embodiment, said at least one opening 26 and/or 27 has a closed opening edge 29 and/or 30 which delimits said opening at a face thereof substantially in axial direction A-A.

In accordance with an embodiment, said at least one axial opening 29 and/or 30 is arranged outside said at least one first cylinder 6 and directed towards at least one of said end bridges 17 and/or 18. In accordance with an embodiment, said at least one opening 29 and/or 30 is at least partially arranged underneath at least one of said end bridges 17 and/or 16.

In accordance with an embodiment, said at least one axial vehicle side opening are two axial openings 26 and 27 which place said channel for receiving the disc 19 in communication with the outside of the vehicle side caliper body 28.

In particular, in accordance with an embodiment, said two axial openings 26 and 27 are well distinct from one another.

In accordance with an embodiment, said two axial openings 26 and 27 are arranged outside said at least one first cylinder 6 and extend on opposite sides of said at least one cylinder towards said end bridges 17 and 18. In accordance with an embodiment, said two axial openings 26 and 27 are at least partially placed underneath said end bridges 17 and 18.

In accordance with an embodiment, said first elongated portion 5 comprises a third vehicle side piston seat, or vehicle side cylinder 31, adapted to seat a third vehicle side piston 32 which may be biased with a brake fluid exiting from said cylinder 31 for influencing a first pad 8 adapted to be seated within said caliper body 1 and arranged between said first vehicle side elongated portion 5 and said first braking surface 3 so as to abut against said first braking surface and to exert a braking action on the brake disc 2.

In accordance with an embodiment, said elongated portion 11 also comprises at least one fourth wheel side piston seat, or wheel side cylinder 33, adapted to seat a fourth piston 34 which may be biased with a brake fluid exiting from said cylinder 33 so as to influence a second opposite pad 14 that is adapted to be seated within said caliper body 1 between said second wheel side elongated portion 11 and said opposite second braking surface 4 of the brake disc 2 so as to abut against said second braking surface and to exert a braking action on the brake disc 2.

In accordance with an embodiment, said at least one axial opening are two axial openings 21 and 22 which place said channel for receiving the disc 19 in communication with the outside of the wheel side caliper body 23 and in which said two axial openings 21 and 22 are arranged outside of said two cylinders, in particular said second and fourth cylinders 12 and 33, and extend on opposite sides of said cylinders 12 and 33 towards said end bridges 17 and 18.

In accordance with an embodiment, said axial openings 21 and 22 are each at least partially placed underneath a respective end bridge 17 and 18.

In accordance with an embodiment, said caliper body 1 further comprises at least one axial vehicle side opening 26 and/or 27 and, in accordance with an embodiment, said at least one axial vehicle side opening 26 and/or 27 are two axial openings 26 and 27 which place said channel for receiving the disc 19 in communication with the outside of the vehicle side caliper body 28. In accordance with an embodiment, said two axial openings 26 and 27 are arranged outside of said second and fourth cylinders 12 and 33 on opposite sides thereof and directed towards said end bridges 17 and 18.

In accordance with an embodiment, said two axial openings 26 and 27 are arranged at least partially underneath respective end bridges 17 and 18.

In accordance with an embodiment, said second wheel side elongated portion 11 comprises an upper longitudinal rib 35. Said upper longitudinal rib 35 is arranged radially outside the caliper body 1 or, in other terms, on the opposite side relative to the axis of rotation X-X of the disc relative to said first wheel side axial opening 21 and/or wheel side axial opening 22, running longitudinally along said second wheel side elongated portion 11. In accordance with an embodiment, said upper longitudinal rib 35 runs substantially from said first disc input side end bridge 17 substantially to said second output side end bridge 18.

In accordance with an embodiment, said upper longitudinal rib defines a connection between said elongated portion, for example wheel side elongated portion, and said end bridges 17, 18.

In accordance with an embodiment, said upper longitudinal rib 35 extends from said second wheel side elongated portion 11 or, in other terms, from a surface parallel to a braking surface of the disc 4, 3, moving away therefrom in the axial direction.

In accordance with an embodiment, said upper longitudinal rib 35 substantially forms a shelf laterally to said end bridges 17,18.

In accordance with an embodiment, said upper longitudinal rib 35 forms a step with said end bridges 17, 18.

Figure 4:
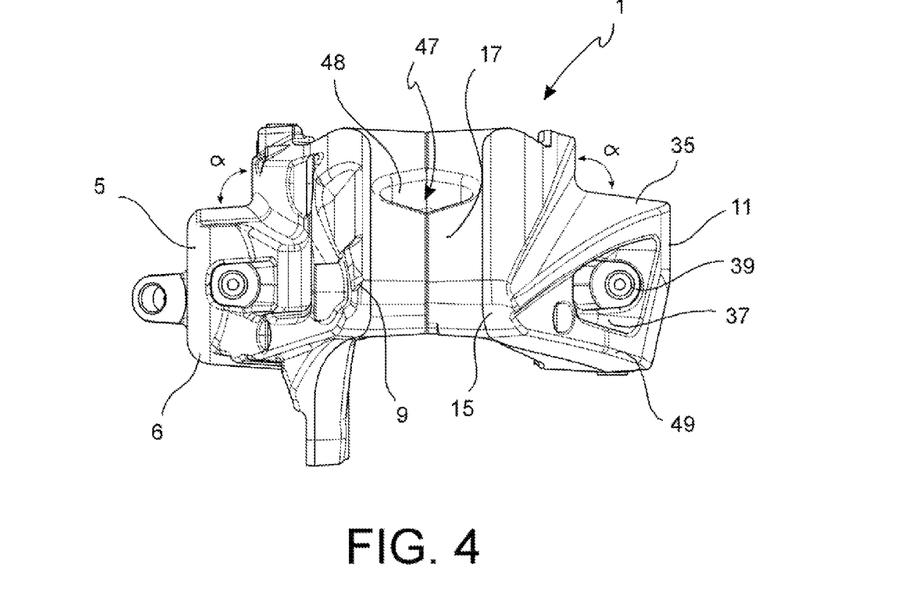
FIG. 4 illustrates a disc input side view of the caliper body of FIG. 1.

In accordance with an embodiment, said upper longitudinal rib 35 has an upper surface facing radially outwardly that forms an angle "a" substantially of 90° or more with the side surface of the end bridges 17, 18 [FIG. 4].

In accordance with an embodiment, said upper longitudinal rib 35 tapers going towards said disc input side end bridge 17. In accordance with an embodiment, said upper longitudinal rib 35 tapers going towards said output side end bridge 18.

In accordance with an embodiment, said upper longitudinal rib 35 going towards said disc input side 17 and disc output 18 end bridges joins with the end 15 and 16 of said wheel side elongated portion 11.

In accordance with an embodiment, said upper longitudinal rib 35 axially extends up to substantially cover the body portion 1 which delimits said at least one second cylinder 12. In accordance with an embodiment, said upper longitudinal rib 35 axially extends up to substantially cover the body 1 portion which delimits said second and fourth wheel side cylinders 12 and 33.

In accordance with an embodiment, said upper longitudinal rib 35 has a substantially central portion 36 forming a radial lowering, or directed towards the axis of rotation of the disc X-X.

In accordance with an embodiment, said central lowered portion 36 is arranged between a second and a fourth wheel side cylinders 12 and 33.

In accordance with an embodiment, about said first and/or second axial openings 21 and 22 of the wheel side elongated portion 11, a lowering 37 is provided, for example, a lowering of the outer surface of the wheel side enlarged member 11.

In accordance with an embodiment, said lowering 37 joins said first and/or second axial openings 21, 22 to the remaining body portion of the wheel side elongated portion 11. In accordance with an embodiment, said lowering 37 forms a lowered plane arranged laterally to said axial opening 21 and/or 22. In accordance with an embodiment, said lowering 37 seats a connecting opening 39 for connecting to the circuit of the brake fluid 38 for example, but not necessarily, venting valve 40, or a joint 41, which allows connecting a connecting pipe 42 for example, to another portion of the circuit of the brake fluid 38.

In accordance with an embodiment, said connecting opening 39 is substantially covered in radial direction by said longitudinal rib 35. Advantageously, said longitudinal rib 35 and said lowering 37 protect said connecting opening 39 against accidental impacts and against crushed stone kicked up for example by the vehicle wheel.

In accordance with an embodiment, said closed edge 24 or 25 of said wheel side axial opening 21 or 22 has a quadrangular shape with an upper side and a lower side 43 and 44 which approach each other going towards the end 15 or 16 of the wheel side elongated portion 11.

In accordance with an embodiment, the sides of said quadrangular edge 24 and 25 are joined together.

In accordance with an embodiment, said wheel side elongated portion 11 has an axial central opening 45 which places said channel for receiving the disc 19 in communication with the outside of the wheel side caliper body 23. In accordance with an embodiment, said axial central opening 45 has a closed edge 46 which delimits said opening at a face thereof substantially in axial direction A-A. In accordance with an embodiment, said at least one axial central opening 45 is arranged between said second and said fourth wheel side cylinders 12 and 33.

In accordance with an embodiment, said closed edge 46 of said axial central opening 45 has a substantially hexagonal shape with sides that are joined together.

In accordance with an embodiment, said closed edge 46 of said axial central opening 45 is joined in the axial direction to the outer surface of the body of the wheel side elongated portion 11.

In accordance with an embodiment, at least one of said end bridges 17 or 18 has a substantially radial opening 47 which places said channel for receiving the disc 19 in communication with the outside of the caliper body 1. Preferably, in accordance with an embodiment, said radial opening 47 is arranged in the center of said end bridge 17 and/or 18.

In accordance with an embodiment, said radial bridge opening 47 has an opening edge 48 having a substantially oval, or lens shape, or a double-U shape with mutually facing openings, which edge delimits the opening so that this has a prevailing extension in the axial direction A-A.

In accordance with an embodiment, said second wheel side elongated portion 11 comprises a lower longitudinal rib 49 arranged radially inside the caliper body 1, or on the side of the axis of rotation X-X of the disc relative to said first wheel side axial opening 21 and/or second wheel side axial opening 22, running longitudinally along said second wheel side elongated portion 11 substantially from said first disc input side end bridge 17 up to said at least one second cylinder 12 or 33 and from substantially said second output side end bridge 18 up to said at least one second cylinder 33 or 12.

In accordance with an embodiment, said lower longitudinal rib 49 extends from said second wheel side elongated portion 11 moving away in axial direction.

In accordance with an embodiment, said lower longitudinal rib 49 tapers going towards said disc input side end bridge 17. In accordance with an embodiment, said lower longitudinal rib 49 tapers going towards said disc output side end bridge 18.

In accordance with an embodiment, said lower longitudinal rib 49 axially extends up to substantially laterally protect the body 1 portion which delimits said at least one second cylinder 12.

In accordance with an embodiment, it axially extends up to substantially laterally protect the body 1 portion which delimits said second and fourth wheel side cylinders 12 and 33.

In accordance with an embodiment, said lower longitudinal rib 49 has a substantially central portion 50 forming a radial raising, or a portion moving away from said axis of rotation of the disc X-X, for example, but not necessarily, which follows the outline of the cylinder(s) 12 and/or 33.

In accordance with an embodiment, said central raised portion 36 is arranged between a second and a fourth wheel side cylinders 12 and 33.

It shall be apparent that those of ordinary skill in the art, in order to meet contingent, specific needs, will be able to make a number of modifications and variations to the brake caliper body according to the invention, all of which anyhow falling within the protection scope of the invention, as defined by the following claims.

In accordance with an embodiment, said axial opening 21 and/or 22 is inserted between a first upper longitudinal or radially outer rib 35 and a second lower longitudinal or radially inner rib 49.

Figure 5:
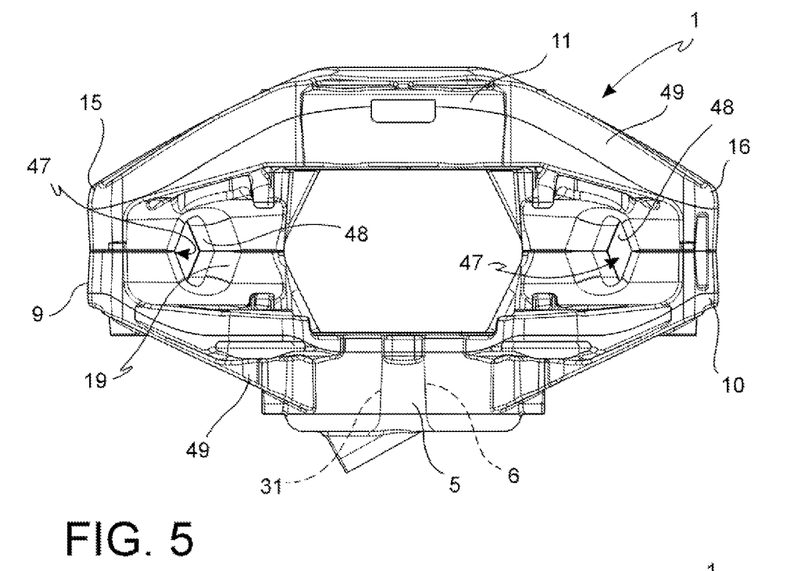
FIG. 5 represents a bottom view, i.e., from the brake disc axis towards the caliper body, of the caliper body of FIG. 1.
Figure 6:
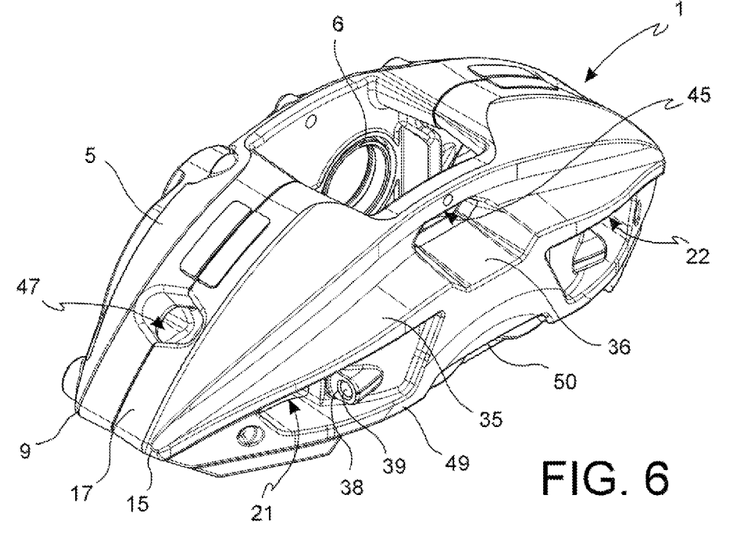
FIG. 6 represents in wheel and disc input side axonometric view a caliper body according to a further embodiment.
Figure 7:
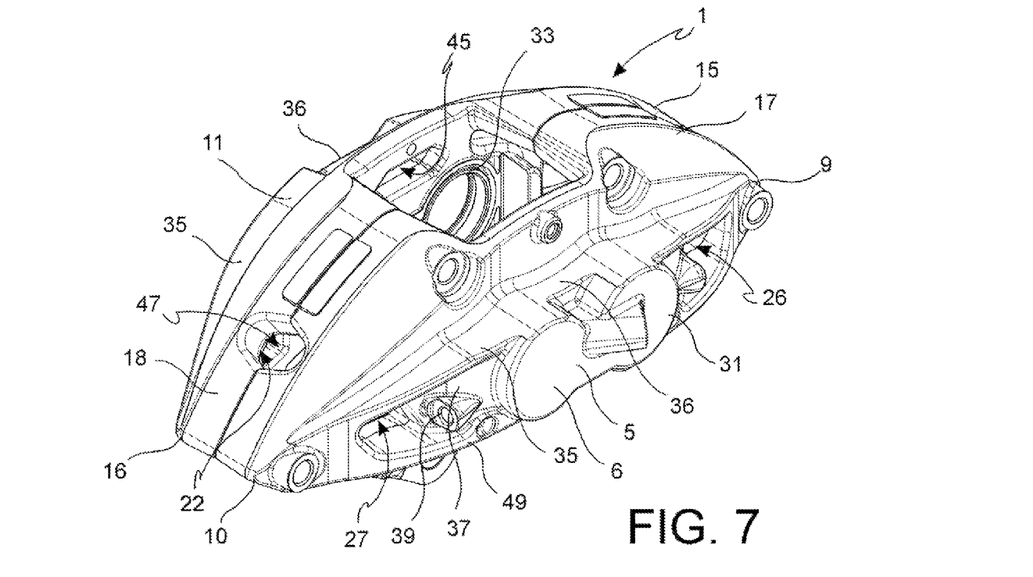
FIG. 7 represents in vehicle and disc output side axonometric view the caliper body of FIG. 6.
Figure 8:
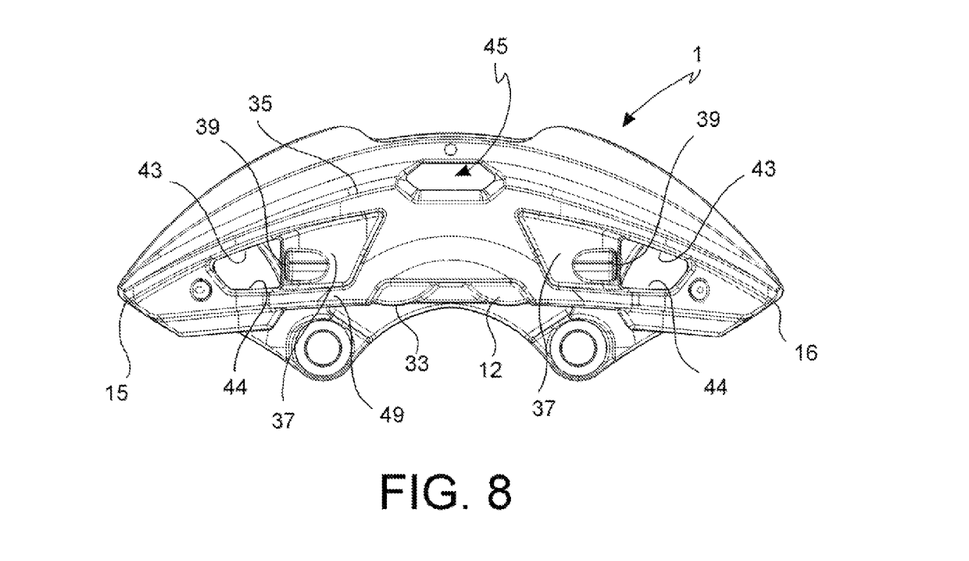
FIG. 8 represents in wheel side front view the caliper body of FIG. 6.
Figure 9:
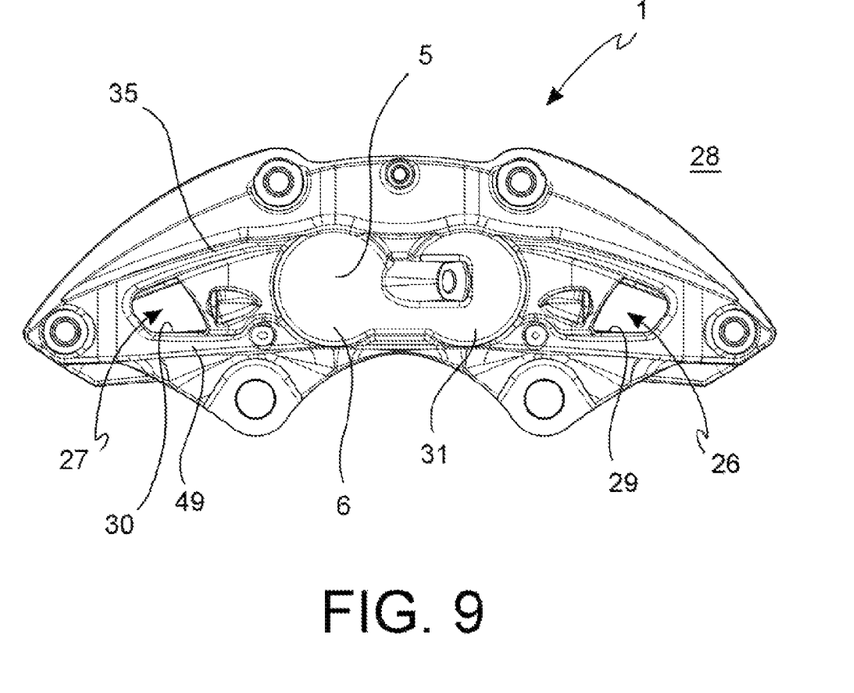
FIG. 9 illustrates in vehicle side back view the caliper body of FIG. 6.

In accordance with an embodiment, said tapered longitudinal rib 35 allows having a shape of the caliper body when seen radially looking from the axis or from the axis of rotation X-X with substantially oval- or lens-shaped overall dimensions.

REFERENCES 1 caliper body
2 disc brake
3 first vehicle side braking surface
4 opposite second wheel side braking surface
5 first vehicle side elongated portion
6 first piston seat or vehicle side cylinder
7 first piston
8 first pad
9 first vehicle side input descend
10 second vehicle side output disc end
11 second wheel side elongated portion
12 second piston seat or wheel side cylinder
13 second piston
14 second opposite pad
15 first wheel side input disc end
16 second wheel side output disc end
17 first disc input end bridge
18 second disc output end bridge
19 channel for receiving a portion of brake disc
20 sector of brake disc seated in the caliper body
21 first wheel side elongated portion opening
22 second wheel side elongated portion opening
23 wheel side caliper body outside
24 first wheel side first opening closed edge
25 second wheel side second opening closed edge
26 first vehicle side elongated portion opening
27 second vehicle side elongated portion opening
28 vehicle side caliper body outside
29 first closed edge first vehicle side opening
30 second vehicle side second opening closed edge
31 third vehicle side cylinder
32 third vehicle side piston
33 fourth wheel side cylinder
34. fourth wheel side piston
35 wheel side upper longitudinal rib
36 lowered rib central portion
lowering of the body of the wheel side elongated portion about the opening
38 brake fluid circuit
39 brake fluid circuit opening
40 venting valve
41 joint
42 connection tube
43 wheel side opening edge upper side
44 wheel side opening lower side
45 central opening
46 central opening axial edge
47 end bridge radial opening
48 central opening edge
49 lower longitudinal rib
50 raised portion following outline of cylinders
51 disc brake caliper

The invention claimed is:

1. Caliper body of a disc brake caliper, said body being adapted to arrange astride of a brake disc having a first braking surface, or vehicle side braking surface, and an opposite second braking surface, or wheel side braking surface, said surfaces being coaxial to an axis of rotation of the disc defining an axial direction, an orthogonal direction radial to the disc, and an orthogonal circumferential or tangential direction, said caliper body comprising:

a first vehicle side elongated portion adapted to face said first braking surface of the brake disc, said elongated portion comprising at least one first vehicle or cylinder side piston seat adapted to seat a first piston which may be biased with a brake fluid exiting from said cylinder for influencing a first pad adapted to be seated within said caliper body between said first vehicle side elongated portion and said first braking surface for abutting against said first braking surface and exerting a braking action on the brake disc, said vehicle side elongated portion having a longitudinal extension in circumferential direction and comprising a first disc input side end and an opposite second disc output side end, said body further comprising an opposite second wheel side elongated portion adapted to face said opposite second braking surface of the brake disc, said elongated portion comprising at least one second wheel or cylinder side piston seat adapted to seat a second piston which may be biased with a brake fluid exiting from said cylinder for influencing a second opposite pad adapted to be seated within said caliper body between said second wheel side elongated portion and said opposite second braking surface for abutting against said second braking surface and exerting a braking action on the brake disc, said wheel side elongated portion having a longitudinal extension in circumferential direction and comprising a first disc input end and an opposite second disc output end, said body further comprising a first disc input end bridge adapted to arrange astride of the brake disc and to connect said first vehicle side disc input end of said first vehicle side elongated portion with said first wheel side disc input end of said second wheel side elongated portion, said body further comprising a second disc output end bridge adapted to arrange astride of the brake disc and to connect said second vehicle side disc output end of said first vehicle side elongated portion with said second wheel side disc output end of said second wheel side elongated portion, said first and second elongated portions and said first and second end bridges forming a yoke which delimits a channel for receiving a portion of the brake disc which is adapted to receive a sector of the brake disc placing the caliper body astride thereof, wherein said second wheel side elongated portion comprises at least one wheel side opening which places said channel for receiving the disc in communication with the outside of the wheel side caliper body, characterised in that said at least one opening is an axial central opening which places said channel for receiving the disc in communication with the outside of the wheel side caliper body, and wherein said axial central opening has a closed edge which delimits said opening at a face thereof substantially in axial direction, and wherein said at least one axial central opening is arranged at least partially substantially radially overlapping at least one wheel side cylinder, wherein said at least one axial central opening is arranged substantially in the center of said second wheel side elongated portion.

2. The caliper body according claim 1, wherein
said wheel side elongated portion has said axial central opening which places said channel for receiving the disc in communication with the outside of the wheel side caliper body, and wherein said at least one axial central opening is arranged between a second and a fourth wheel side cylinders, and/or wherein
said closed edge of said axial central opening has a substantially hexagonal shape with sides joined together, and/or wherein said closed edge of said axial central opening is joined in the axial direction to the outer surface of the body of the wheel side elongated portion.

3. The caliper body according to claim 1, wherein
at least one further axial opening is provided, arranged outside of said at least one cylinder towards at least one of said end bridges and at least partially underneath at least one of said end bridges, and/or wherein, said further axial opening has a closed edge which delimits said opening at a face thereof substantially in axial direction, and/or wherein said first vehicle side elongated portion comprises at least one vehicle side opening which places said channel for receiving the disc in communication with the outside of the vehicle side caliper body, and wherein
said at least one opening has a closed edge which delimits said opening at a face thereof substantially in axial direction, and/or wherein said at least one axial opening is arranged outside of said at least one first cylinder towards at least one of said end bridges and at least partially underneath at least one of said end bridges, and/or wherein
said at least one axial vehicle side opening are two axial openings which place said channel for receiving the disc in communication with the outside of the vehicle side caliper body and wherein said two axial openings are arranged outside of said at least one first cylinder on opposite sides of said cylinder towards said end bridges and placed at least partially underneath said end bridges.

4. The caliper body according to claim 1, wherein
said first elongated portion comprises a third vehicle side piston or vehicle side cylinder seat adapted to seat a third vehicle side piston which may be biased with a brake fluid exiting from said cylinder for influencing a first pad adapted to be seated within said caliper body between said first vehicle side elongated portion and said first braking surface for abutting against said first braking surface and exerting a braking action on the brake disc, and/or wherein
said elongated portion comprising at least one fourth wheel side piston or wheel side cylinder seat adapted to seat a fourth piston which may be biased with a brake fluid exiting from said cylinder for influencing a second opposite pad adapted to be seated within said caliper body between said second wheel side elongated portion and said opposite second braking surface for abutting against said second braking surface and exerting a braking action on the brake disc, and/or wherein
said at least one axial opening are two axial openings which place said channel for receiving the disc in communication with the outside of the wheel side caliper body and wherein said two axial openings are arranged outside said two second and fourth cylinders on opposite sides of said cylinders towards' said end bridges and at least partially placed underneath said end bridges, and/or wherein
said caliper body further comprises at least one axial vehicle side opening, and/or wherein
said at least one axial vehicle side opening are two axial openings which place said channel for receiving the disc in communication with the outside of the vehicle side caliper body and wherein said two axial openings are arranged outside said second and fourth cylinders on opposite sides of said cylinders towards said end bridges and at least partially placed underneath said end bridges.

5. The caliper body according to claim 1, wherein
said second wheel side elongated portion comprises an upper longitudinal rib arranged radially outside the caliper body or on the opposite side relative to the axis of rotation of the disc relative to said first wheel side axial opening and/or second wheel side axial opening, running longitudinally along said second wheel side elongated portion substantially from said first disc input side end bridge up to substantially said second disc output side end bridge, and/or wherein said upper longitudinal rib extends from said second wheel side elongated portion moving away in axial direction, and/or wherein
said upper longitudinal rib tapers going towards said disc input side end bridge and/or said upper longitudinal rib tapers going towards said disc output side end bridge and/or wherein
said upper longitudinal rib axially extends up to substantially cover the body portion which delimits said at least one second cylinder and/or axially extends up to substantially cover the body portion which delimits said second and fourth wheel side cylinders, and/or wherein
said upper longitudinal rib has a substantially central portion forming a radial lowering or towards the axis of rotation of the disc, and/or wherein
said central lowered portion is arranged between a second and fourth wheel side cylinders.

6. The caliper body according to claim 1, wherein
a lowering is provided about said first and/or second axial openings of the wheel side elongated portion, and/or wherein
said lowering joins said first and/or second axial openings to the remaining body portion of the wheel side elongated portion, and/or wherein in said lowering a connecting opening to the circuit of the brake fluid is provided, for example, but not necessarily, for connecting a venting valve or a joint with a connecting pipe to another portion of the brake circuit, and/or wherein
said connecting opening is substantially covered in radial direction by said longitudinal rib.

7. The caliper body according to claim 1, wherein
said closed edge of said wheel side axial opening has a quadrangular shape with upper and lower sides which approach each other going towards the end of the wheel side elongated portion, and/or wherein
the sides of said quadrangular edge are joined together.

8. The caliper body according to claim 1, wherein
at least one further axial opening is provided, arranged outside said at least one cylinder towards at least one of said end bridges and at least partially underneath at least one of said end bridges, and/or wherein,
said at least one axial opening are two axial openings which place said channel for receiving the disc in communication with the outside of the wheel side caliper body and wherein
said two axial openings are arranged outside said at least one cylinder on opposite sides of said cylinder towards said end bridges and at least partially placed underneath said end bridges.

9. The caliper body according to claim 1, wherein
at least one of said end bridges has a substantially radial opening which places said channel for receiving the disc in communication with the outside of the caliper body, and/or wherein
said radial bridge opening has an opening edge of substantially oval or lens or opposite "U" shape which delimits the opening with prevailing extension in axial direction.

10. The caliper body according to claim 1, wherein
said second wheel side elongated portion comprises a lower longitudinal rib arranged radially inside the caliper body or on the side of the axis of rotation of the disc relative to said first wheel side axial opening and/or second wheel side axial opening, running longitudinally along said second wheel side elongated portion substantially from said first disc input side end bridge up to said at least one second cylinder and from substantially said second disc output side end bridge up to said at least one second cylinder, and/or wherein said lower longitudinal rib extends from said second wheel side elongated portion moving away in axial direction, and/or wherein said lower longitudinal rib tapers going towards said disc input side end bridge and/or said lower longitudinal rib tapers going towards said disc output side end bridge and/or wherein
said lower longitudinal rib axially extends up to substantially laterally protect the body portion which delimits said at least one second cylinder and/or axially extends up to substantially laterally protect the body portion which delimits said second and fourth wheel side cylinders, and/or wherein
said lower longitudinal rib has a substantially central portion forming a radial raising or a portion moving away from said axis of rotation of the disc, for example but not necessarily, which follows the outline of the cylinder, and/or wherein
said central raised portion is arranged between a second and fourth wheel side cylinders.

11. A caliper for a disc brake comprising a caliper body as defined in claim 1.

* * * * *